July 12, 1938.  C. E. BLANCHARD  2,123,352
AIR CONDITIONING SYSTEM UTILIZING REFRIGERATION
Filed July 8, 1937
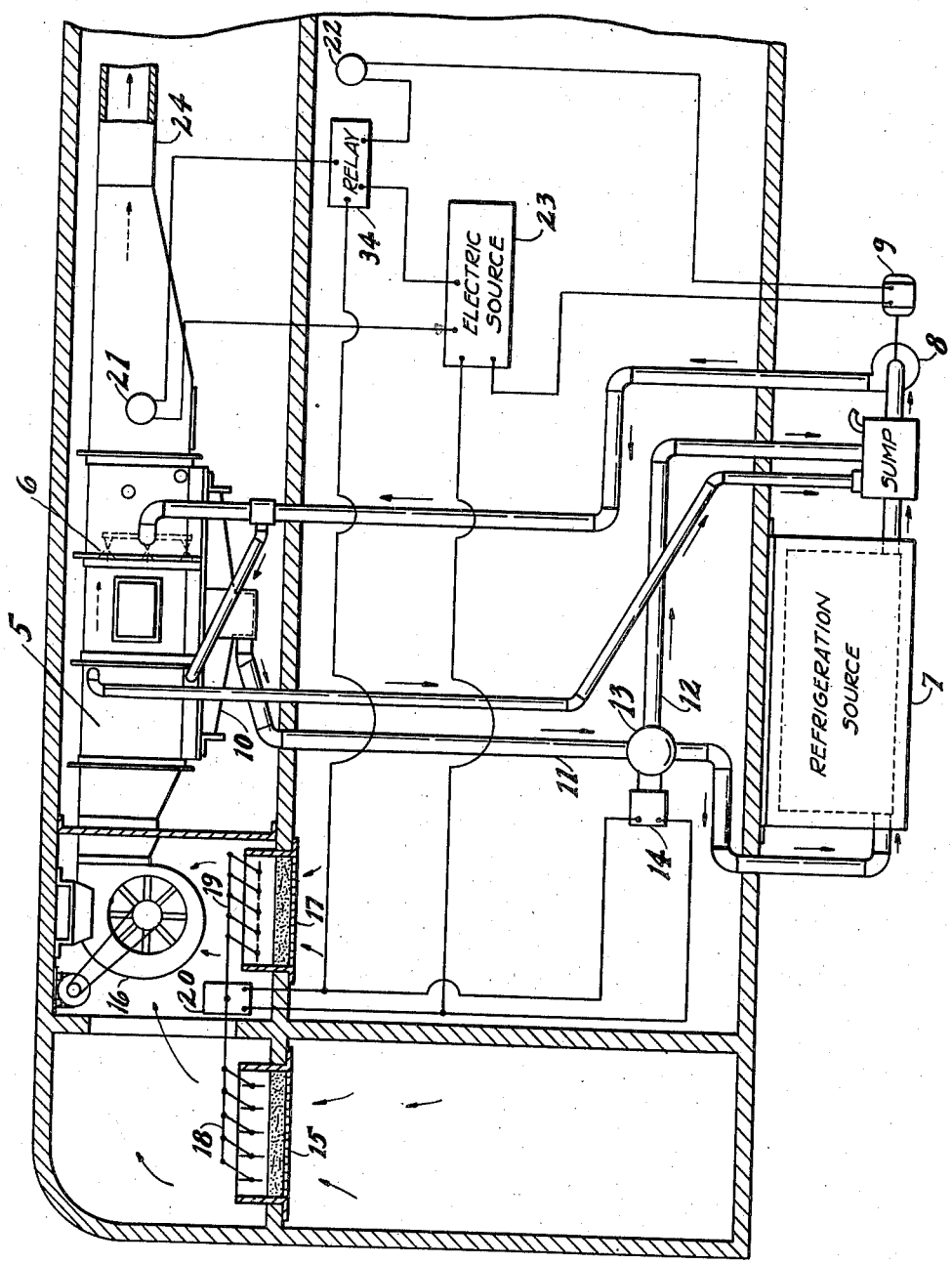
INVENTOR.
CHARLES E. BLANCHARD
BY Robert J. Palmer
ATTORNEY.

Patented July 12, 1938

2,123,352

UNITED STATES PATENT OFFICE 2,123,352

AIR CONDITIONING SYSTEM UTILIZING REFRIGERATION

Charles Everett Blanchard, Randolph, Mass., assignor to B. F. Sturtevant Company, Boston, Mass.

Application July 8, 1937, Serial No. 152,559

9 Claims. (Cl. 62—129)

This invention relates to air conditioning systems utilizing refrigeration and relates more particularly to an air conditioning system for passenger vehicles, combining evaporative cooling with cooling by refrigeration.

The application is a continuation in part of my co-pending application, Serial No. 126,186, filed February 17, 1937.

The passenger cars on some railroad lines on one continuous trip, pass through regions in which, in summer different demands are made upon the air conditioning equipment. For example, a train may first pass through a region having a high wet bulb as well as a high dry bulb temperature, requiring considerable refrigerating energy for the cooling and dehumidification of the air. The train may next pass through a region having such a low wet bulb temperature that evaporative cooling may be effectively employed.

It has been proposed to utilize devices responsive to changes in the wet bulb temperature of the outdoor air for switching a spray type cooling system for a passenger vehicle, from cooling by refrigeration to evaporative cooling when the wet bulb temperature of the outdoor air is low enough for this to be effective, and to switch from evaporative cooling to cooling by refrigeration when the wet bulb temperature is too high. Experience has shown that devices responsive to changes in wet bulb temperatures are complicated; that they are often inaccessible for inspection and servicing etc., when mounted in the fresh air stream, and often due to sun effect etc. in the vehicles, the wet bulb temperature of the outdoor air increases between the time it passes the control instrument and the time it enters the spray chamber.

According to this invention, one or more dry bulb thermostats mounted in the conditioned air stream, control the conversion from evaporative cooling to cooling by refrigeration and vice versa. The regular thermostat in the passenger space starts the system on evaporative cooling. Then if the wet bulb temperature of the outdoor air is sufficiently low for evaporative cooling to be sufficient, the temperature of the conditioned air after a given period of time reaches a predetermined low point and the simple dry bulb thermostat or thermostats in the conditioned air stream act to continue the evaporative cooling cycle. But if the wet bulb temperature of the outdoor air is too high for evaporative cooling to be effective, the temperature of the conditioned air does not reach the predetermined low point and the thermostat in the conditioned air stream switches the system from evaporative cooling to cooling by refrigeration.

An object of the invention is to provide means and methods for effective air conditioning with and without refrigeration.

Another object of the invention is to provide a switching arrangement with controls for the effective conditioning of air utilizing refrigeration when needed and dispensing with refrigeration when not needed.

Other objects of the invention will be apparent from the following description taken together with the drawing.

The invention will now be described with reference to the drawing which illustrates diagrammatically one embodiment of the present invention as installed in a railroad passenger car.

The spray type cooler 5 is mounted in one end and in the roof zone of the car, and contains the spray nozzles 6 which are supplied with water from the refrigeration source 7 through the action of the pump 8 which is driven by the electric motor 9. The water from the spray nozzles 6 is collected in the sump 10 and returns through the pipe 11 to the refrigeration source 7 or through the by-pass pipe 12 around the source 7. The valve 13 controlled by the solenoid 14 determines whether or not the spray water is to pass through the source 7 or through the by-pass pipe 12 in a path around the source 7. This by-pass path is provided during the evaporative cooling cycle for discontinuing the cooling of the water by refrigeration.

Fresh air enters through the inlet 15 into the blower 16 of the cooler 5 and recirculated air from the passenger space enters through the inlet 17 into the blower 16. The fresh air inlet 15 contains the adjustable dampers 18 and the recirculated air inlet 17 contains the adjustable dampers 19. The dampers 18 and 19 are adjusted by the motor 20 which acts to open one set of dampers and to close the other set of dampers under control of the thermostat 21 when the system is shifted from evaporative cooling to cooling by refrigeration and vice versa, as will be explained.

The thermostat 22 is the ordinary thermostat mounted in the passenger space and its contacts are in series with the relay 34, the electric source 23 and the pump 8. It controls the action of the cooler 5 by starting and stopping the pump 8 and by energizing and deenergizing the relay 34. When the temperature in the car is above a predetermined point, the thermostat 22 starts the pump and energizes the relay and when the desired low temperature has been reached, the thermostat 22 stops the pump and deenergizes the relay.

The thermostat 21 which is preferably a simple dry bulb thermostat is mounted at the discharge side of the cooler 5 so as to be in contact with the conditioned air as it leaves the cooler and prior to its discharge into the passenger space. This thermostat 21 acts to shift the cooler 5 from evaporative cooling to cooling by refrigeration, and vice versa. It is connected to the relay 34 which is of the time delay type. Such a relay is illustrated and described on page 427 of the "Relay Handbook", published in 1926 by the National Electric Light Association, 29 W. 39th Street, New York city. The relay 34 under control of the thermostat 21 acts when refrigerative cooling is required, to connect the damper control motor to the electric source 23 to cause the recirculated air dampers 19 to be opened, and simultaneously energizes the solenoid 14 to cause the water to flow to the source 7 due to closing off the by-pass around same.

All air conditioned railway passenger cars in the United States and Canada employ Standard Vapor Car Company control panels which have "off" and "on" switches for starting and stopping the air conditioning equipment. When the switches are in the "off" position, all of the air conditioning equipment is deenergized.

When the wet bulb temperature of the outside air is low enough for evaporative cooling to be effective, at which time it may be at say 60° F., and fresh air alone is passed through the spray cooler, to which cooler non-refrigerated water is supplied then the spray water will soon become cooled down to the wet bulb temperature of the air and the dry bulb temperature of the air will also be reduced to the wet bulb temperature. This cooling of the spray water and of the air is called evaporative cooling. When the outside wet bulb temperature is 60° F., then after the system has been operating by evaporative cooling a short time, the dry bulb temperature of the air leaving the cooler 12, experience has shown, falls to about 63° F. If the outside wet bulb temperature is above 60° F., the dry bulb temperature of the air leaving the cooler will be above 63° F. A dry bulb thermostat located at the output side of the spray cooler will therefore indicate when the wet bulb temperature of the outdoor air is sufficiently low for evaporative cooling.

According to the present embodiment, the system is adjusted to always start in an evaporative cooling cycle; this, regardless of the condition of the outdoor air. When the thermostat 22 calls for cooling, it closes the circuit including the electric source 23, the relay 34 and the pump 8; the pump 8 is started and water is sprayed in the cooler 5. The relay 34 is connected into circuit but the solenoids 14 and 20 are deenergized at this time with the result that the recirculated air dampers are fully closed, and the water returned from the cooler flows through the by-pass pipe 12 around the refrigeration source 7. The air leaving the spray cooler passes over the thermostat 21. The contacts of the thermostat 21 remain closed above say 63° dry bulb temperature and open at 63° and at temperatures below 63°. If the air in contact with the thermostat 21 fails after a predetermined period of time after the pump 8 is started by the thermostat 22, to reach 63° dry bulb temperature, then the thermostat 21, through the relay 34 closes the water by-pass around the refrigeration source 7 and opens the water path to the refrigeration source 7, so that the water returned from the spray chamber is cooled by refrigeration. This is accomplished by energization of the solenoid 14. At the same time, the solenoid 20 is energized to partially close the fresh air dampers 18 and to partially open the recirculated air dampers 19. The relay 34 provides the necessary time interval.

If the temperature of the air leaving the spray chamber during the time the system is operating in the evaporative cooling cycle, passing over the thermostat 21, is at or below 63° dry bulb, then the contacts of the solenoid 21 open, disconnecting the relay 34 from the electric source 23, so that the solenoids 14 and 20 are not energized with the result that the system continues to operate on the evaporative cooling cycle.

It is seen that the dry bulb temperature of the air leaving the spray cooler varies in accordance with the wet bulb temperature of the outside air entering the cooler when the cooler is operated in the evaporative cooling cycle. One or more dry bulb thermostats mounted at the output side of the spray cooler can therefore, control effectively the conversion of the system from the one cooling cycle to the other.

Obviously, it will take longer for the air in contact with the thermostat 21 to be cooled down to 63° F. than were it to be cooled to a higher temperature. If desired, one or more additional thermostats 21 may be provided for quicker conversion from one type of cooling to the other where this is desired. For example, a 69° thermostat and a 66° thermostat might also be provided adjacent the thermostat 21. Then, when the thermostat 22 calls for cooling and the system starts up in an evaporative cooling cycle, if the temperature of the air leaving the spray cooler is cooled to 69° F. or lower, the 69° thermostat would deenergize its associated relay to permit the system to continue under evaporative cooling. Likewise the 66° thermostat, would after a longer period of time, when the temperature of the conditioned air reached 66°, deenergize its associated relay to permit the system to continue in the evaporative cooling cycle. But, if after a given period of time, the air reaching the 69° thermostat was not cooled to 69°, the 69° thermostat would allow its associated relay to convert the system from evaporative cooling to cooling by refrigeration. Likewise, after a longer chosen interval, the 66° thermostat would, if the temperature of the air was not cooled to 66°, allow its associated relay to convert the system to the refrigerating cooling cycle. Thus, such intermediate relays could be provided for hastening the conversion from evaporative cooling to cooling by refrigeration, when the outside wet bulb temperature was not sufficiently low for evaporative cooling to be effective. Likewise, the thermostat 21, even if the conditioned air temperature of 63° dry bulb corresponded to the outdoor wet bulb temperature of 60°, could be made to operate accurately at a higher temperature, say 66°, by properly selecting this higher temperature and the time delay afforded by the relay 34. For example, if the outdoor wet bulb temperature is at or below 60° F., then after a given period of time, the temperature of the conditioned air, assuming the car thermostat 22 calls for cooling at 75° F., will be cooled to say 70° F. and after a little longer period of time it will be cooled to 66° F. Thus, by selecting the proper time interval necessary for the control thermostat 21 to be cooled to 66°, a 66° thermostat may be made to control the conversion of the system from one type of cooling to the other. This also, would provide a shorter interval between the switching of evaporative cooling to cooling by refrigeration, when the condition of the outside air is such that evaporative cooling would not be effective.

While one embodiment of the invention has been described for the purpose of illustration, it should be understood that the invention is not limited to the exact arrangement described, since many departures will suggest themselves to those skilled in the art, after having had access to this disclosure.

What is claimed is:

1. Air conditioning apparatus comprising a spray cooler, means for passing outside air through said cooler, pumping means for circulating water to and from said cooler, means for discharging the air to be conditioned into the space to be served, means responsive to the temperature in said space for energizing said pumping means when the temperature in said space increases above a predetermined point, cooling means for cooling said water, means responsive to the temperature of the air discharged by said cooler for initiating the operation of said cooling means when the temperature of the air discharged by said cooler is above a predetermined point, and means for delaying the action of said last mentioned means for a predetermined period after said pumping means is energized.

2. Air conditioning apparatus comprising a spray cooler, means for passing outside air through said cooler, pumping means for circulating water to and from said cooler, discharge means for passing the air from said cooler into the space to be served, means responsive to the temperature in said space for energizing said pumping means when the temperature in said space increases above a predetermined point, cooling means for cooling said water, temperature responsive means between said cooler and said discharge means for initiating the operation of said cooling means when the temperature of the air discharged by said cooler is above a predetermined point, and means for delaying the action of said last mentioned means for a predetermined period after said pumping means is energized.

3. Air conditioning apparatus comprising a spray cooler, means for passing outside air through said cooler, pumping means for circulating water to and from said cooler, means for discharging the air to be conditioned into the space to be served, temperature responsive means in said space for energizing said pumping means when the temperature in said space increases above a predetermined point, cooling means for cooling said water, means responsive to the temperature of the air from said cooler prior to its discharge into said space for initiating the operation of said cooling means following a rise in the temperature of the air discharged by said cooler above a predetermined point, and means controlled by said temperature responsive means for delaying the action of said last mentioned means for a predetermined period after said pumping means is energized.

4. An air conditioning system comprising a spray cooler, means for passing outside air and recirculated air from the space served through said cooler, means for adjusting the volumes of outside and recirculated air passed by said means, discharge means for passing air from said cooler into the space to be served, pumping means for supplying water to said cooler, refrigerative means for cooling said water, means responsive to the temperature in said space for initiating the operation of said pumping means and for adjusting said second mentioned means to decrease the volume of recirculated air supplied to said cooler when the temperature in said space rises to a predetermined point, and means responsive to the temperature of the air leaving said cooler prior to its discharge into said space for initiating the operation of said refrigerative means and for adjusting said second mentioned means to increase the volume of recirculated air supplied to said cooler following a rise in the temperature of the air discharged by said cooler above a predetermined point.

5. An air conditioning system comprising a spray cooler, means for passing outside air and recirculated air from the space served, through said cooler, means for adjusting the volumes of outside and recirculated air passed by said means, discharge means for passing air from said cooler into the space to be served, pumping means for supplying water to said cooler, refrigerative means for cooling said water, means responsive to the temperature in said space for initiating the operation of said pumping means and for adjusting said second mentioned means to decrease the volume of recirculated air supplied to said cooler when the temperature in said space rises to a predetermined point, means responsive to the temperature of the air leaving said cooler prior to its discharge into said space for initiating the operation of said refrigerative means and for adjusting said second mentioned means to increase the volume of recirculated air supplied to said cooler following a rise in the temperature of the air discharged by said cooler above a predetermined point, and means for relaying the action of said last mentioned means for a predetermined period of time after said pumping means is energized.

6. An air conditioning system comprising a spray cooler, means for passing outside air and recirculated air from the space served, through said cooler, means for adjusting the volumes of outside and recirculated air passed by said means, discharge means for passing air from said cooler into the space to be served, pumping means for supplying water to said cooler, refrigerative means for cooling said water, means responsive to the temperature in said space for initiating the operation of said pumping means and for adjusting said second mentioned means to decrease the volume of recirculated air supplied to said cooler when the temperature in said space rises to a predetermined point, means responsive to the temperature of the air leaving said cooler prior to its discharge into said space for initiating the operation of said refrigerative means and for adjusting said second mentioned means to increase the volume of recirculated air supplied to said cooler following a rise in the temperature of the air discharged by said cooler above a predetermined point, and means controlled by said temperature responsive means for delaying the action of said last mentioned means for a predetermined period of time after said pumping means is energized.

7. Air conditioning apparatus for supplying air to a passenger vehicle, comprising a spray cooler, means for passing outside air through said cooler and for then supplying it into the passenger space, pumping means for circulating water to and from said cooler, a thermostat exposed to air supplied by said cooler and connected to said pumping means for initiating same for operating said apparatus in evaporative cooling when cooling is required in said space, cooling means for cooling said water, and a second thermostat exposed to air supplied by said cooler and connected to said cooling means for initiating same for cooling said water when after a period of time the operation of said apparatus in evaporative cooling is ineffective for cooling said space to the desired degree.

8. Air conditioning apparatus for supplying air to a passenger vehicle, comprising a spray cooler, means for passing outside air through said cooler and for then supplying it into the passenger space, pumping means for circulating water to and from said cooler, a thermostat exposed to air supplied by said cooler and connected to said pumping means for initiating same for operating said apparatus in evaporative cooling when cooling is required in said space, cooling means for cooling said water, and a second thermostat exposed to air supplied by said cooler and functioning after said thermostat has initiated said pumping means and connected to said cooling means for initiating same when the operation of said apparatus in evaporative cooling is ineffective for cooling said space to the desired degree.

9. Air conditioning apparatus for supplying air to a passenger vehicle, comprising a spray cooler, means for passing outside air through said cooler and for then supplying it into the passenger space, pumping means for circulating water to and from said cooler, a thermostat exposed to air supplied by said cooler and connected to said pumping means for initiating same for operating said apparatus in evaporative cooling when cooling is required in said space, air inlet means for supplying recirculated air from said passenger space into said cooler, cooling means for cooling said water, and a second thermostat exposed to air supplied by said cooler and functioning after said thermostat has initiated said pumping means for initiating said cooling means and for actuating said air inlet means for supplying recirculated air into said cooler when after a period of time the operation of said apparatus in evaporative cooling is ineffective for cooling said space to the desired degree.

CHARLES EVERETT BLANCHARD.